Patented Sept. 25, 1928.

1,685,156

UNITED STATES PATENT OFFICE.

FRANCESCO GIORDANI, OF NAPLES, ITALY, ASSIGNOR TO POMILIO BROTHERS CORPORATION, OF NEW YORK, N. Y., A CORPORATION OF NEW YORK.

ELECTROCHEMICAL PROCESS FOR SEPARATING IRON FROM ALUMINUM.

No Drawing.  Application filed August 25, 1922. Serial No. 584,387.

Certain applications are known of the principle of solution tension for the electrolytic separation, without supplying any external current, of metallic elements in the state of purity from the solutions of their salts, operating in such a way that no impurities may pass into the precipitated mass. The advantage of this process from an economic standpoint is the possibility of using as a substitute element which replaces in the solution the metal being precipitated, another metal less costly.

Such properties, according to the present invention, can in some cases find an application which is precisely the inverse of that above described: we can have for instance the case in which, in view of the proposed further treatment of the salt of the principal metal, it may be necessary to eliminate the impurities which are contained in it, and, in order to eliminate these, we can conduct the operation so as to dissolve a further quantity of the metal of greater value, a quantity that may be sufficient to replace the metals constituting the impurities which are to be precipitated, thus obtaining a pure solution which can be directly subjected to the further proposed metallurgical operations. Only it must be noted that in such a case, in order to render more energetic the action which might take place very slowly because of the small concentration of the ions, and because of the phenomena of polarization, it is desirable to resort to a real voltaic couple short circuited.

In order to be precise, let us assume a solution comprising salts of the metallic elements A, B, C, . . . and let us suppose that we wish to eliminate the element A which is present in small quantity, thus practically constituting an impurity, and such as to have a solution tension inferior to that of the other elements B, C, . . . . To this end we provide in the liquor a voltaic couple with two metallic plates, one made of the element A, which we wish to eliminate, and which functions as positive pole, the other made of one of the elements B, C, . . ., preferably of that element having the highest tension of solution. Then this latter electrode being negative, will send into solution some ions displacing those of the element A which will pass to and are deposited on the positive electrode, which may be constituted of carbon or of any metal having a solution tension lower than A.

A practical case in which, as an example, the method of purification above described finds convenient application is that of the elimination of the iron from the liquor originated from the acid attack of the leucites and of aluminum-potassium silicates in general, with the scope of obtaining from them the pure aluminum hydroxide up to 99.5 of purity such as it is required for the manufacture of aluminum in the electric furnaces, for the preparation of the salts used as mordants and other similar uses, this process being fully set forth in my co-pending application No. 584,386 of even date herewith and in Patents 1,556,543 and 1,559,179 to Umberto Pomilio and myself.

The liquors obtained from the acid treatment of the rocks are conveniently neutralized so as not to contain any free acid, and are passed into appropriate tanks in which are plunged electrodes of aluminum and carbon (graphite) connected to form a circuit.

A voltaic couple is then formed:

Aluminum $(-)$ liquor/graphite $(+)$

The aluminum passes into solution in the state of ions $Al^{+++}$ in a first stage at the expense of the reduction of the ferric salt to ferrous salt and successively displacing the iron (ions $Fe^{++}$) from the solution, while these latter ions go to deposit themselves on the carbon.

Through this process it is possible to recover a liquor containing only the salts of aluminum and potassium.

The electricity generated by the voltaic couples above described may also be recovered by connecting them appropriately to storage batteries or other instrumentalities appropriate for the storage or utilization of electric energy.

What I claim is:—

In a process for purifying solutions consisting mainly of aluminum salts, positioning therein an electrode of aluminum and another adapted to act as positive electrode for a metal to be eliminated, and connecting them in circuit, substantially as set forth.

In witness whereof, I have hereunto set my hand at Naples, Italy, this 15th day of October, A. D. nineteen hundred and twenty-one.

FRANCESCO GIORDANI.